US009458784B2

(12) United States Patent
Uemura

(10) Patent No.: US 9,458,784 B2
(45) Date of Patent: Oct. 4, 2016

(54) HEATER CONTROL APPARATUS AND SENSOR CONTROL SYSTEM

(71) Applicant: NGK SPARK PLUG CO., LTD., Nagoya-shi, Aichi (JP)

(72) Inventor: Tomonori Uemura, Komaki (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 444 days.

(21) Appl. No.: 14/064,841

(22) Filed: Oct. 28, 2013

(65) Prior Publication Data
US 2014/0121851 A1 May 1, 2014

(30) Foreign Application Priority Data
Oct. 29, 2012 (JP) ................................. 2012-238323

(51) Int. Cl.
| | | |
|---|---|---|
| G05D 23/19 | (2006.01) | |
| F02D 41/14 | (2006.01) | |
| G05D 23/24 | (2006.01) | |
| F02D 41/20 | (2006.01) | |

(52) U.S. Cl.
CPC ......... *F02D 41/1454* (2013.01); *F02D 41/146* (2013.01); *F02D 41/1494* (2013.01); *G05D 23/1919* (2013.01); *G05D 23/24* (2013.01); *F02D 2041/2027* (2013.01); *F02D 2041/2048* (2013.01)

(58) Field of Classification Search
CPC .................. F02D 41/1454; F02D 2041/2048; F02D 41/146; F02D 41/1494; F02D 2041/2027; G05D 23/1919; G05D 23/24; G05D 23/19
See application file for complete search history.

(56) References Cited

U.S. PATENT DOCUMENTS

| | | | |
|---|---|---|---|
| 5,719,778 A | 2/1998 | Suzumura et al. | |
| 6,276,192 B1 * | 8/2001 | Sim | B60H 1/008 73/23.31 |
| 6,332,459 B1 * | 12/2001 | Ehara | F02D 41/1494 73/23.32 |
| 6,336,354 B1 * | 1/2002 | Suzuki | G01N 27/4067 73/23.21 |

(Continued)

FOREIGN PATENT DOCUMENTS

| | | |
|---|---|---|
| JP | 8-278279 A | 10/1996 |
| JP | 2000-065780 A | 3/2000 |

(Continued)

OTHER PUBLICATIONS

Communication dated Apr. 26, 2016, from the Japanese Patent Office in counterpart application No. 2012-238323.

*Primary Examiner* — Kenneth M Lo
*Assistant Examiner* — Derrick Boateng
(74) *Attorney, Agent, or Firm* — Sughrue Mion, PLLC

(57) ABSTRACT

A heater control apparatus (1) includes a heater driver (51) which is turned on and off in accordance with a pulse drive signal PS, heater energization control means S33, S39 for outputting the pulse drive signal PS to the heater driver 51 so as to control the supply of electric current to the heater section (4), power supply voltage detection means S30, S35 for detecting a power supply voltage VB of the power supply BT, ideal electric energy obtaining means S31, S37 for obtaining an unit ideal electric energy WAi, actual electric energy calculation means S36 for calculating an unit actual electric energy WA, and duty ratio determination means S38 for determining a duty ratio DT(n+1) of the pulse drive signal PS such that the unit actual electric energy WA(n+1) becomes equal to the unit ideal electric energy WAi(n+1) in the next period T(n+1).

10 Claims, 9 Drawing Sheets

(56) References Cited

U.S. PATENT DOCUMENTS

| | | |
|---|---|---|
| 6,651,639 B2 | 11/2003 | Hada et al. |
| 8,372,256 B2 * | 2/2013 | Matsuoka ........... G01N 27/4077 73/23.31 |
| 2002/0078938 A1 | 6/2002 | Hada et al. |
| 2006/0157348 A1 * | 7/2006 | Inoue ................. F02D 41/1494 73/1.06 |
| 2007/0007136 A1 * | 1/2007 | Awano ............... G01N 27/4071 204/424 |
| 2007/0204840 A1 * | 9/2007 | Abe .................... F02D 41/1494 123/697 |
| 2012/0072162 A1 * | 3/2012 | Guglielmone ........ F01N 11/002 702/130 |

FOREIGN PATENT DOCUMENTS

| | | |
|---|---|---|
| JP | 2002-257779 A | 9/2002 |
| JP | 2006-113081 A | 4/2006 |
| JP | 2008-203190 A | 9/2008 |
| JP | 2010-145256 A | 7/2010 |

* cited by examiner

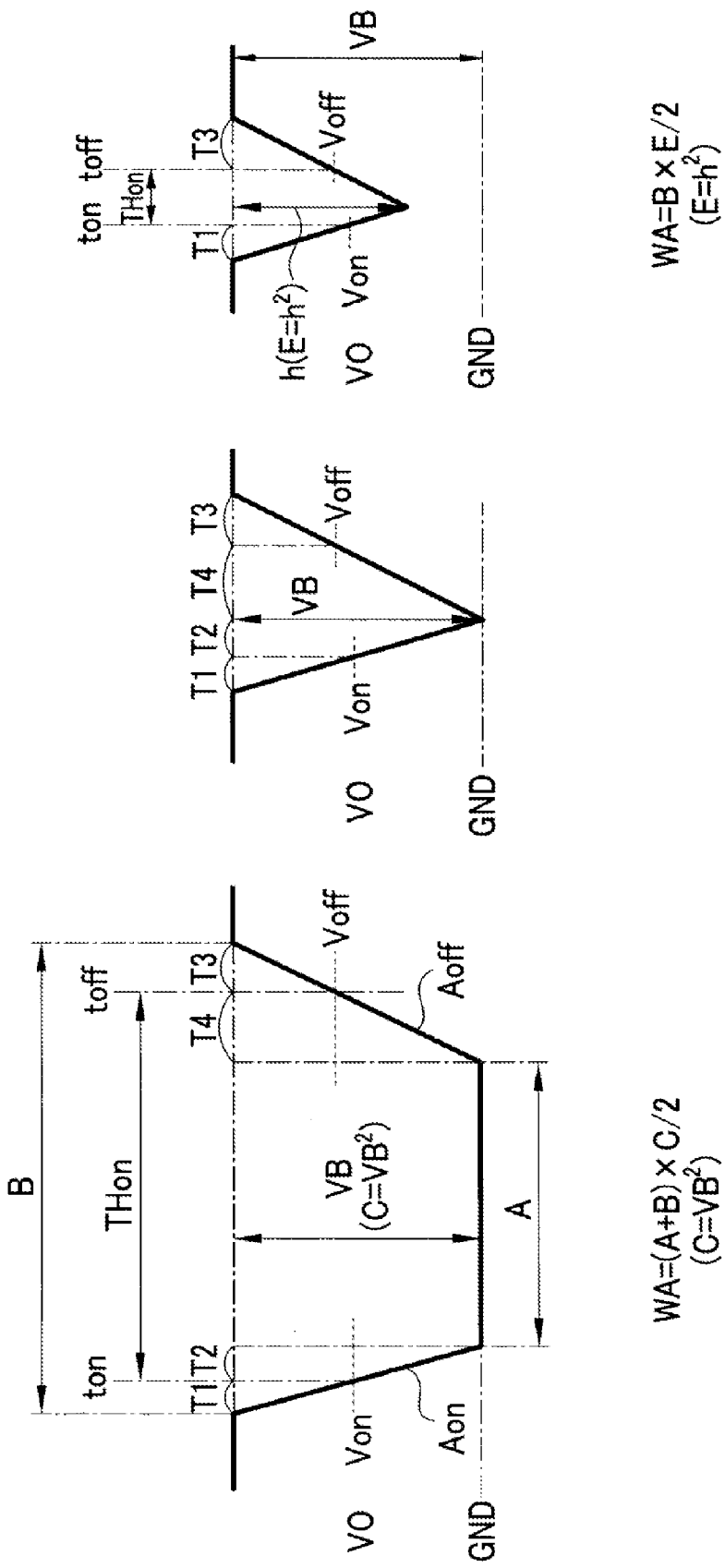

HEATER CONTROL APPARATUS AND SENSOR CONTROL SYSTEM

BACKGROUND OF THE INVENTION

1. Field of the Invention

The present invention relates to a heater control apparatus for controlling a heater section of a sensor and to a sensor control system including the sensor and heater control apparatus.

2. Description of the Related Art

A conventionally known example of a sensor having a heater section is a gas sensor which detects the concentration of a specific gas contained in exhaust gas, such as an oxygen sensor or a nitrogen oxide (NOx) sensor. These gas sensors include a sensor element section which is formed of a solid electrolyte body mainly made of zirconia, and a heater section which heats the sensor element section. The heater section is controlled by a heater control apparatus so as to bring the sensor element section into an activated state. For example, Patent Document 1 discloses a heater control apparatus which controls the amount of electric current supplied to a heater section by controlling its duty ratio.

[Patent Document 1] Japanese Patent Application Laid-Open (kokai) No 2002-257779

Problems to be Solved by the Invention

In order to maintain the activated sensor element section at a predetermined activation temperature, the above mentioned type of heater control apparatus calculates the element temperature from the impedance of the sensor element section or the like, and performs feedback control for controlling the amount of electric current supplied to the heater section based on the calculated element temperature. Meanwhile, before the sensor element section reaches the activated state, the heater control apparatus energizes the heater section in accordance with a predetermined energization pattern so as to heat the sensor element section from a low-temperature state to the activated state. When the sensor element section is heated to the activated state, it is desirable to heat the sensor element section as soon as possible. However, for example, consider a case where a vehicle is started, and operation of the sensor is initiated after the vehicle has been parked overnight. If the sensor element section is heated quickly after start up, water droplets adhering to the interior of the exhaust pipe of an internal combustion engine or the interior of the sensor may adhere to the sensor element section and/or the heater section and cause them to crack. In order to overcome this problem, the heater section and the sensor element section are pre-heated in some cases. Specifically, before heating the sensor element section to the activated state (e.g., immediately after start up of the vehicle), the heater control apparatus supplies a small amount of electric power to the heater section so as to pre-heat the heater section and the sensor element section to a degree sufficient for evaporating water adhering to the sensor element section, etc. This is done until the water droplets adhering to the interior of the exhaust pipe of the internal combustion engine or various portions within the sensor are removed. Hereinafter, the period of such pre-heating is referred to as a "pre-heating period."

Here, a case will be considered where a heater driver is turned on and off in accordance with a pulse drive signal. In the case where the heater driver is a high side driver, the output voltage of the heater driver rises when the heater driver turns on and falls when the heater driver turns off. A predetermined time is also needed for the output voltage of the heater driver to rise or fall. Further, when the pulse drive signal changes, there is a delay until the output voltage of the heater driver actually begins to change following a change in the pulse drive signal. Therefore, if the duty ratio (ON duty ratio) of the pulse drive signal is decreased so as to turn on the heater driver for a short period of time and thereby supply a small amount of electric power to the heater section, the influence of the delay and times required for the rising and falling of the output voltage become relatively large. As a result, the amount of electric energy that is actually supplied to the heater section within a predetermined period of time (specifically, the amount of electric energy supplied to the heater section in each period of the pulse drive signal) becomes excessively small in some instances. In particular, in the case where a sensor is installed in a vehicle employing a 24 V battery, the duty ratio of the pulse drive signal for supplying a certain amount of electric energy becomes smaller as compared with the case where a 12 V battery is used, and the above-mentioned influences become large. Therefore, even when the above-mentioned pre-heating period is provided, the requisite amount of electric energy is not supplied to the heater section, and pre-heating of the heater section and the sensor element section cannot be performed properly in some cases.

SUMMARY OF THE INVENTION

The present invention has been accomplished in view of the above-mentioned problems, and an object thereof is to provide a heater control apparatus which can supply the requisite amount of electric energy to a heater section of a sensor by properly turning a heater driver on and off even when the duty ratio of a pulse drive signal becomes small. Other objects of the present invention are to provide a sensor control system which includes the sensor and heater control apparatus.

The above objects of the present invention have been achieved by providing (1) a heater control apparatus configured for controlling a heater section of a sensor, the heater control apparatus comprising a heater driver which is turned on and off in accordance with a pulse drive signal composed of an on signal and an off signal appearing alternatingly and which supplies electric power from a power supply to the heater section; heater energization control means for outputting the pulse drive signal to the heater driver so as to control the supply of electric current to the heater section; power supply voltage detection means for detecting a power supply voltage of the power supply; ideal electric energy obtaining means for obtaining a unit ideal electric energy which is an ideal electric energy to be applied to the heater section in respective periods of the pulse drive signal; actual electric energy calculation means for calculating an unit actual electric energy which is an electric energy actually applied to the heater section in the respective periods; and duty ratio determination means for determining a duty ratio of the pulse drive signal based on the unit actual electric energy obtained for the current period and the unit ideal electric energy for the current period such that the unit actual electric energy becomes equal to the unit ideal electric energy in a next period.

The heater control apparatus (1) includes ideal electric energy obtaining means for obtaining the unit ideal electric energy and actual electric energy calculation means for calculating the unit actual electric energy, and determines the duty ratio of the pulse drive signal based on the unit actual electric energy obtained for the current period and the unit ideal electric energy for the current period such that the unit actual electric energy becomes equal to the unit ideal electric energy in the next period. As a result, the duty ratio is determined such that even in the case where the duty ratio becomes small, the unit actual electric energy actually applied to the heater section becomes equal to the unit ideal electric energy, whereby the requisite amount of electric energy can be applied to the heater section. Therefore, for example, in the case where a pre-heating period is provided, pre-heating of the heater section and the sensor element section can be properly performed.

An example of the heater driver is a switching element such as a power transistor, a power MOSFET, or an IPD (Intelligent Power Device). The heater driver may be a high side driver which is interposed between the power supply and the heater section or a low side driver which is interposed between the heater section and a reference potential such as ground (GND). In the case of the high side driver, the output voltage of the heater driver rises when the heater driver turns on, and falls when the heater driver turns off. In the case of the low side driver, the output voltage of the heater driver falls when the heater driver turns on, and rises when the heater driver turns off.

A specific example of the method of calculating the unit actual electric energy is by measuring the on time of the heater driver in addition to detecting the power supply voltage, and using the previously obtained turn on and turn off rates of the heater driver as described below.

Another example of the method of calculating the unit actual electric energy is a method of actually measuring the change of the output voltage of the heater driver in real time using, for example, a high-speed A/D converter and a DSP (digital signal processor) which can perform high speed processing, and calculating the unit actual electric energy.

In a preferred embodiment (2), the above-described heater control apparatus (1) further comprises on-time obtaining means for obtaining a heater on time which is a time between a point when the heater driver has actually turned on and a point when the heater driver has actually turned off, wherein the actual electric energy calculation means calculates the unit actual electric energy based on the power supply voltage and the heater on time.

The heater control apparatus (2) includes on-time obtaining means for obtaining the heater on time, and calculates the unit actual electric energy based on the detected power supply voltage and the heater on time. Examples of the parameters which determine the unit actual electric energy, other than the power supply voltage and the heater on time, include a change in the output voltage per unit time (rate) in the turn on and turn off periods of the heater driver. However, since these parameters are determined as values peculiar to a given heater driver, previously stored values can be used as the parameters. Also, a reference table for obtaining a unit actual electric energy corresponding to the power supply voltage and the heater on time may be used. The unit actual electric energy is obtained by referring to the reference table. Accordingly, the unit actual electric energy can be properly calculated by obtaining at least the power supply voltage and the heater on time.

In a preferred embodiment (3) of the above-described heater control apparatus (2), the on-time obtaining means includes on-timing detection means for detecting an on timing at which the output voltage of the heater driver reaches a predetermined on threshold voltage in a period in which the heater driver turns on after the pulse drive signal has been changed from the off signal to the on signal; off-timing detection means for detecting an off timing at which the output voltage reaches a predetermined off threshold voltage in a period in which the heater driver turns off after the pulse drive signal has been changed from the on signal to the off signal; and clocking means for clocking, as the heater on time, a time between the on timing and the off timing.

In the heater control apparatus (3), the on-time obtaining means includes on-timing detection means, off-timing detection means and clocking means. As a result, the heater on time can be properly obtained.

In the case where a microprocessor is used, the on-timing detection means and the off-timing detection means may be realized by the microprocessor. The microprocessor is configured to detect the on timing and the off timing by generating corresponding interruptions to the microprocessor when the output voltage of the heater driver becomes the on threshold voltage and the off threshold voltage, respectively. Also, the clocking means for clocking the elapsed time from the on timing to the off timing may be realized by the microprocessor which is configured to start a timer by interruption processing performed at the on timing, stop the timer by interruption processing performed at the off timing, and measure the elapsed time between the two timings.

In a preferred embodiment (4), the above-described heater control apparatus (3) further comprises storage means for storing a turn on rate which is a change in the output voltage per unit time during the period in which the heater driver turns on and a turn off rate which is a change in the output voltage per unit time during the period in which the heater driver turns off, wherein the actual electric energy calculation means calculates the unit actual electric energy based on the power supply voltage, the heater on time, the turn on rate, and the turn off rate.

The heater control apparatus (4) calculates the unit actual electric energy based on not only the detected power supply voltage and the heater on time, but also the stored turn on rate and the turn off rate. As a result, it is possible to properly calculate the unit actual electric energy and determine the duty ratio for the next period.

In a preferred embodiment (5) of the above-described heater control apparatus (4), the heater driver is a high side driver disposed between the power supply and the heater section. In this case, the actual electric energy calculation means obtains, as a first time, a value calculated by dividing the on threshold voltage by the turn on rate, obtains, as a second time, a value calculated by dividing a difference between the power supply voltage and the on threshold voltage by the turn on rate, obtains, as a third time, the absolute value of a value calculated by dividing the off threshold voltage by the turn off rate, and obtains, as a fourth time, the absolute value of a value calculated by dividing a difference between the power supply voltage and the off threshold voltage by the turn off rate. Further, the actual electric energy calculation means calculates the unit actual electric energy in accordance with an expression WA=(A+B)×C/2 when the heater on time is greater than the sum of the second time and the fourth time, and calculates the unit actual electric energy in accordance with an expression WA=B×E/2 when the heater on time is equal to or less than the sum of the second time and the fourth time, wherein A represents a value obtained by subtracting the second time and the fourth time from the heater on time, B represents a value obtained by adding the first time and the third time to the heater on time, C represents the square of the power supply voltage, D represents a value obtained by adding the first time, the second time, the third time, and the fourth time, and E represents the square of the product of the power supply voltage and a value obtained by dividing B by D.

In the heater control apparatus (5) in which the heater driver is a high side driver, the unit actual electric energy is obtained simply in accordance with the above-described computation expression.

In a preferred embodiment (6) of the above-described heater control apparatus (4), the heater driver is a low side driver disposed between the heater section and a reference potential. In this case, the actual electric energy calculation means obtains, as a first time, the absolute value of a value calculated by dividing a difference between the power supply voltage and the on threshold voltage by the turn on rate, obtains, as a second time, the absolute value of a value calculated by dividing the on threshold voltage by the turn on rate, obtains, as a third time, a value calculated by dividing a difference between the power supply voltage and the off threshold voltage by the turn off rate, and obtains, as a fourth time, a value calculated by dividing the off threshold voltage by the turn off rate. The actual electric energy calculation means calculates the unit actual electric energy in accordance with an expression WA=(A+B)×C/2 when the heater on time is greater than the sum of the second time and the fourth time, and calculates the unit actual electric energy in accordance with an expression WA=B×E/2 when the heater on time is equal to or less than the sum of the second time and the fourth time, wherein A represents a value obtained by subtracting the second time and the fourth time from the heater on time, B represents a value obtained by adding the first time and the third time to the heater on time, C represents the square of the power supply voltage, D represents a value obtained by adding the first time, the second time, the third time and the fourth time, and E represents the square of the product of the power supply voltage and a value obtained by dividing B by D.

In the heater control apparatus (6) in which the heater driver is a low side driver, the unit actual electric energy is obtained simply in accordance with the above-described computation expression, as in the case where the heater driver is a high side driver.

In a preferred embodiment (7) of the above-described heater control apparatus of any of (1) to (6) above, the duty ratio determination means calculates the duty ratio for the next period in accordance with an expression DT(n+1)=DT(n)×WAi(n)/WA(n) (n: natural number), wherein DT(n) represents the duty ratio in the current period, WAi(n) represents the unit ideal electric energy for the current period, and WA(n) represents the unit actual electric energy obtained for the current period.

In the heater control apparatus (7), the duty ratio for the next period is calculated in accordance with the above-described computation expression. As a result, the requisite duty ratio for the next period can be determined through simple computation.

In a preferred embodiment (8), the above-described heater control apparatus of any of (1) to (7) above further comprises initial duty ratio calculation means for calculating an initial value of the duty ratio by dividing the unit ideal electric energy in the first period by the square of the power supply voltage.

In the heater control apparatus (8), the value obtained by dividing the unit ideal electric energy in the first period of the pulse drive signal (at the time when the energization of the heater section starts) by the square of the power supply voltage is used as the initial value of the duty ratio. Since the initial value of the duty ratio can be set to a proper value based on the unit ideal electric energy, it is possible to obtain the requisite unit actual electric energy at the beginning and to properly perform the subsequent determination of the duty ratio.

In a preferred embodiment (9) of the above-described heater control apparatus of any of (1) to (8) above, the sensor includes a sensor element section formed of a solid electrolyte body, and the heater section heats the sensor element section. In that case, the duty ratio determination means determines the duty ratio in a period for pre-heating the sensor element section before heating the sensor element section to an activated state.

In The heater control apparatus (9), the duty ratio determination means determines the duty ratio in a period for pre-heating the sensor element section before heating the sensor element section to the activated state. The duty ratio may have a very small calculated value during the above-mentioned pre-heating period for pre-heating the sensor element section. However, the pre-heating of the sensor element section can be performed properly by determining a proper duty ratio such that the unit actual electric energy becomes equal to the unit ideal electric energy.

In another aspect (10), the present invention provides a sensor control system which comprises a sensor having a heater section, and the heater control apparatus of any of (1) to (9) above.

Since the sensor control system (10) can apply a proper amount of electric energy to the heater section of the sensor, sensor control can be performed properly.

BRIEF DESCRIPTION OF THE DRAWINGS

FIGS. 9(a) through 9(c) illustrate a method of calculating unit actual electric energy according to the modified embodiment.

DESCRIPTION OF SYMBOLS

Figure 1:
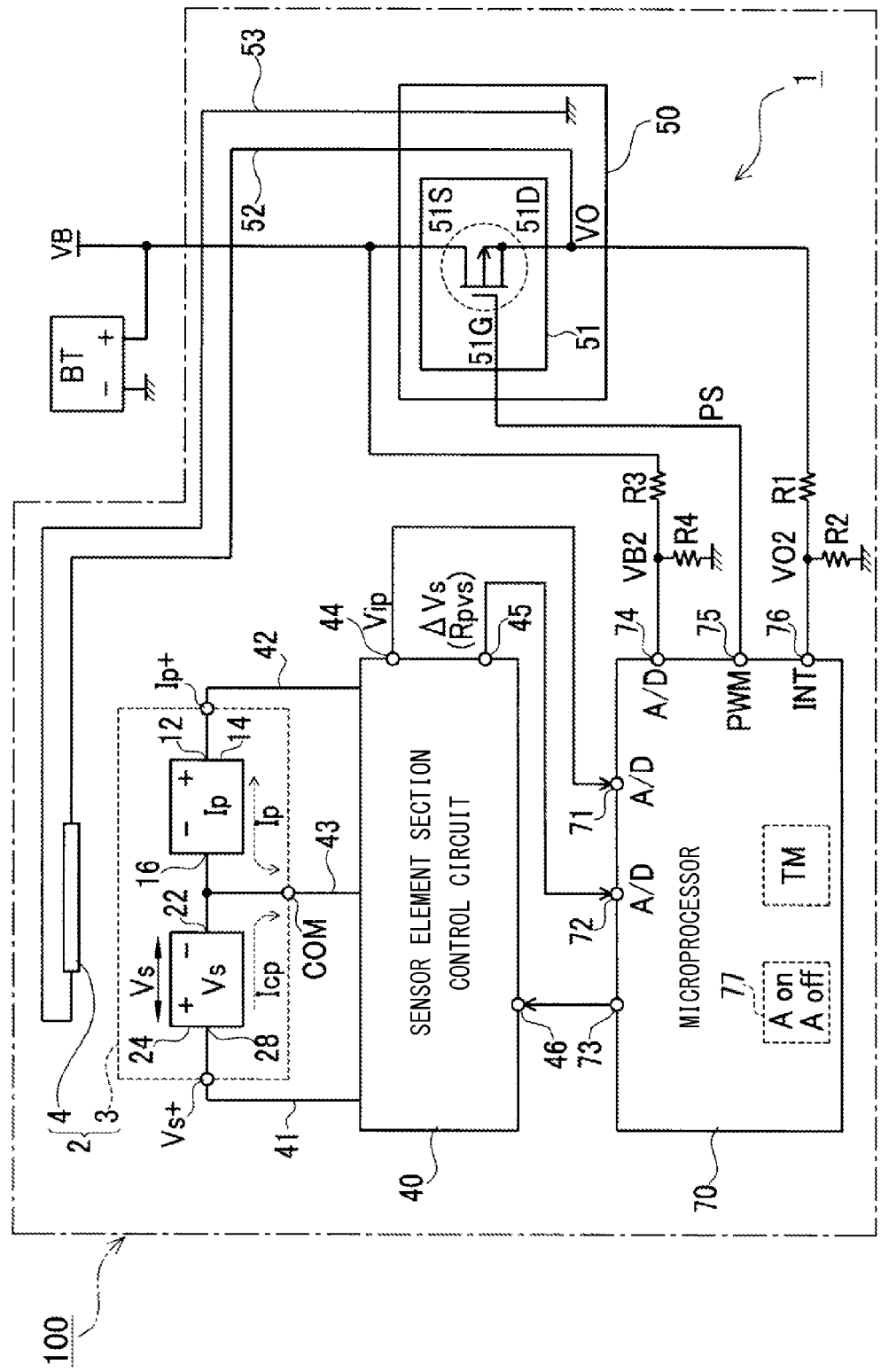
FIG. 1 is an explanatory diagram schematically showing the configurations of a gas sensor control apparatus and a sensor control system according to an embodiment of the invention.

Symbols used to identify various features in the drawings include the following.

100, 100A: sensor control system
1, 1A: gas sensor control apparatus (heater control apparatus)
2: gas sensor
3: sensor element section
4: heater section
40: sensor element section control circuit
50, 150: heater section control circuit (heater energization control means)
51, 151: heater driver
70: microprocessor
74: A/D input port (power supply voltage detection means)
76: interruption input terminal (on-timing detection means, off-timing detection means)
77: nonvolatile memory (storage means)
TM: timer (clocking means)
BT: power supply (battery)
VB: power supply voltage
PS: pulse drive signal
PSon: on signal
PSoff: off signal
T: period
VO: output voltage
Von: on threshold voltage
Voff: off threshold voltage
ton: on timing
toff: off timing
THon: heater on time
Aon: turn on rate
Aoff: turn off rate
T1: first time
T2: second time
T3: third time
T4: fourth time
WAi: unit ideal electric energy
WA: unit actual electric energy
S10: on-timing detection means
S20: off-timing detection means
S21: clocking means
S30, S35: power supply voltage detection means
S31, S37: ideal electric energy obtaining means
S32: initial duty ratio calculation means
S36: actual electric energy calculation means
S38: duty ratio determination means
S33, S39: heater energization control means

DETAILED DESCRIPTION OF THE INVENTION

Embodiment

An embodiment of the present invention will now be described with reference to the drawings. However, the present invention should not be construed as being limited thereto.

FIG. 1 is a diagram schematically showing the configurations of a gas sensor control apparatus 1 (heater control apparatus) and a sensor control system 100 according to the present embodiment. The gas sensor control apparatus 1 includes a microprocessor 70, a sensor element section control circuit 40, and a heater section control circuit 50, and is connected to a gas sensor 2 so as to control the same. The gas sensor 2 and the gas sensor control apparatus 1 constitute the sensor control system 100.

The gas sensor 2 is an air-fuel-ratio sensor (full-range oxygen sensor) which is attached to the exhaust pipe of the internal combustion engine of an unillustrated vehicle, and detects the concentration of oxygen contained in exhaust gas (air-fuel ratio). The detected oxygen concentration (air-fuel ratio) is used so as to perform feedback control of air-fuel ratio for the internal combustion engine. This gas sensor 2 includes a sensor element section 3 for detecting the oxygen concentration, and a heater section 4 for heating the sensor element section 3.

The sensor element section 3 of the gas sensor 2 has a known structure in which a pump cell 14 and an electromotive force cell 24 are stacked via a spacer constituting a hollow measurement chamber (not shown) into which exhaust gas can be introduced, and an electrode located on one side of the electromotive force cell 24 opposite the measurement chamber is closed by a shield layer (not shown). Each of the pump cell 14 and the electromotive force cell 24 includes, as a substrate, a platelike, oxygen-ion-conductive solid electrolyte body mainly made of zirconia, and porous platinum electrodes 12, 16 and 22, 28 formed on opposite sides of the substrate. The electrode 16 at one end of the pump cell 14 and the electrode 22 at one end of the electromotive force cell 24 are electrically connected to each other and are connected to a terminal COM of the sensor element section 3. The electrode 12 at the other end of the pump cell 14 is connected to a terminal Ip+ of the sensor element section 3, and the electrode 28 at the other end of the electromotive force cell 24 is connected to a terminal Vs+ of the sensor element section 3.

The sensor element section 3 is connected to the sensor element section control circuit 40 of the gas sensor control apparatus 1 through three lead wires 41, 42 and 43 connected to the terminals Vs+, Ip+ and COM, respectively. The sensor element section control circuit 40 is mainly composed of an ASIC (Application-Specific Integrated Circuit). While supplying a very small current Icp to the electromotive force cell 24 of the sensor element section 3, the sensor element section control circuit 40 controls the pump cell current Ip flowing through the pump cell 14 such that the electromotive force cell voltage Vs generated between the opposite ends of the electromotive force cell 24 becomes 450 mV, to thereby pump out oxygen contained in the exhaust gas introduced into the measurement chamber or pump oxygen into the measurement chamber. Since the magnitude and flow direction of the pump cell current Ip flowing through the pump cell 14 change depending on the oxygen concentration of the exhaust gas (air-fuel ratio), the concentration of oxygen contained in the exhaust gas can be calculated based on the pump cell current Ip.

In the sensor element section control circuit 40, the magnitude of the pump cell current Ip is converted to an analog voltage signal, which is detected as a gas detection signal Vip and is output from a gas detection signal output terminal 44. Also, in addition to the gas detection signal Vip, the sensor element section control circuit 40 detects a voltage change amount ΔVs which changes in accordance with the element resistance Rpvs of the electromotive force cell 24 of the sensor element section 3. A serial transmission port 73 of the microprocessor 70 is connected to a command reception port 46 of the sensor element section control circuit 40. In response to an instruction from the microprocessor 70, the sensor element section control circuit 40 supplies a constant current to the electromotive force cell 24 temporarily, detects the voltage change amount ΔVs, and outputs ΔVs from a voltage change amount output terminal 45. The microprocessor 70 can receive the gas detection signal Vip and the voltage change amount ΔVs through A/D input ports 71 and 72.

The microprocessor 70 calculates the element resistance Rpvs of the electromotive force cell 24 from the voltage change amount ΔVs, and controls energization of the heater section 4 of the gas sensor 2 based on the calculated element resistance Rpvs through the heater section control circuit 50. The circuit configuration and operation of the sensor element section control circuit 40 for detecting the gas detection signal Vip and the voltage change amount ΔV are disclosed in, for example, U.S. Patent Application No. 2010/0108540 (see descriptions in paragraphs [0045] to [0049] and FIG. 2, incorporated herein by reference, and are well known to those of ordinary skill in this field of art. Therefore, the details thereof will not be described here.

Next, the heater section control circuit 50 will be described.

As shown in FIG. 1, the heater section control circuit 50 has a heater driver 51 including a power MOS-FET. A drain 51D (output terminal) of the heater driver 51 is connected to one end of the heater section 4 of the gas sensor 2 via a lead wire 52. The other end of the heater section 4 is connected to the heater section control circuit 50 via a lead wire 53, and is connected to a reference potential (GND) within the heater section control circuit 50. A source 51S of the heater driver 51 is connected to a + terminal of a power supply BT which outputs a power supply voltage VB. Namely, the heater driver 51 is a high side driver which is disposed between the power supply BT and the heater section 4. A gate 51G of the heater driver 51 is connected to a PWM (pulse-width-modulated) output port 75 of the microprocessor 70. The heater driver 51 is turned on and off in accordance with a pulse drive signal PS output from the PWM output port 75, whereby the supply of electric current to the heater section 4 is controlled. The heater section 4 is united with the sensor element section 3 of the gas sensor 2. When the pump cell 14 and the electromotive force cell 24 of the sensor element section 3 are activated as a result of heating by the heater section 4, detection of the oxygen concentration becomes possible.

In the present embodiment, the power supply BT is a 24 V battery. Although the power supply voltage VB output from the power supply BT is a standard 24 V, it varies within a range of about 16 V to about 32 V depending on conditions.

FIGS. 2(a) and 2(b) are timing charts showing the relationship between the pulse drive signal PS (FIG. 2(a)) and the output voltage VO (FIG. 2(b)) of the heater driver 51. The pulse drive signal PS is a pulse signal which is composed of an on signal PSon and an off signals PSoff appearing alternatingly and in which the on signal PSon appears at predetermined intervals corresponding to a period T (T=10 msec in the present embodiment) (see FIG. 2(a)). Incidentally, when the heater driver 51 is turned on and off in accordance with the pulse drive signal PS, as shown in FIG. 2(a), the output voltage VO at the drain 51D of the heater driver 51 changes with a delay after the rising and falling of the pulse drive signal PS (see FIG. 2(b)). Specifically, in the case where the pulse drive signal PS rises and serves as an on signal PSon at time $t_0$, the output voltage VO of the heater driver 51 begins to change with a rising delay time Tdlu and reaches the power supply voltage VB after elapse of a rising time Tup. Meanwhile, in the case where the pulse drive signal PS falls and serves as an off signal PSoff at time $t_1$, the output voltage VO of the heater driver 51 begins to change with a falling delay time Tdld and returns to 0 V after elapse of a falling time Tdw.

FIGS. 3(a) and 3(b) are timing charts corresponding to FIGS. 2(a) and 2(b), respectively, and showing the relation between the pulse drive signal PS and the output voltage VO of the heater driver 51 for the case where the duty ratio (on duty ratio) DT(=PSon/T) of the pulse drive signal PS is small. As shown on the left side of FIGS. 3(a) and 3(b), in the case where the duty ratio (the ratio of the pulse width of the on signal PSon to the period T) of the pulse drive signal PS (see FIG. 3(a)) is small, the output voltage VO of the heater driver 51 (see FIG. 3(b)) has a triangular waveform, and the output voltage VO does not reach the power supply voltage VB. Namely, the electric energy actually applied to the heater section 4 during this period T is smaller than an ideal electric energy which should be applied to the heater section 4 in accordance with the duty ratio.

In the present embodiment, a pre-heating period is provided for pre-heating the sensor element section 3 before heating the sensor element section 3 to an activated state. In this pre-heating period, since the duty ratio of the pulse drive signal PS is set to a small value so as to supply a small amount of electric power to the heater section 4, the state shown on the left side of FIGS. 3(a) and 3(b) is likely to occur. In such a case, in order to supply the ideal electric energy to the heater section 4, it is necessary to increase the time of the on signal PSon as shown on the right side of FIGS. 3(a) and 3(b); namely, a correction for increasing the duty ratio must be performed.

In the gas sensor control apparatus 1 of the present embodiment, the drain 51D (output terminal) of the heater driver 51 is connected to one end of the heater section 4 through the lead wire 52, and is also connected to an interruption input terminal 76 of the microprocessor 70 through a resistor R1. Further, the interruption input terminal 76 is connected to the reference potential (GND) through a resistor R2. Namely, the output voltage VO at the drain 51D of the heater driver 51 is divided by the resistor R1 and the resistor R2, and the voltage VO2 (=VO×R2/(R1+R2)) obtained as a result of the voltage division is input to the interruption input terminal 76 (see FIG. 1).

When the voltage VO2 input to the interruption input terminal 76 changes from a low level to a high level, a rising edge interruption to the microprocessor 70 occurs. Also, when the voltage VO2 changes from the high level to the low level, a falling edge interruption to the microprocessor 70 occurs.

An on threshold voltage Von in FIG. 2(b) corresponds to a threshold voltage for the output voltage VO at which the rising edge interruption to the microprocessor 70 occurs. An off threshold voltage Voff in FIG. 2(b) corresponds to a threshold voltage for the output voltage VO at which the falling edge interruption to the microprocessor 70 occurs.

Namely, when the output voltage VO changes and reaches the on threshold voltage Von, the rising edge interruption to the microprocessor 70 occurs, and when the output voltage VO falls to the off threshold voltage Voff, the falling edge interruption to the microprocessor 70 occurs.

Accordingly, the rising edge interruption to the microprocessor 70 occurs at a timing at which the output voltage VO reaches the predetermined on threshold voltage Von during a period in which the heater driver 51 turns on after the pulse drive signal PS is changed from the off signal PSoff to the on signal PSon. Here, the timing at which the rising edge interruption occurs will be referred to as the on timing ton.

Also, the falling edge interruption to the microprocessor 70 occurs at a timing at which the output voltage VO reaches the predetermined off threshold voltage Voff during a period in which the heater driver 51 turns off after the pulse drive signal PS is changed from the on signal PSon to the off signal PSoff. Here, the timing at which the falling edge interruption occurs will be referred to as the off timing toff.

The microprocessor 70 clocks a heater on time THon which is an elapsed time from the on timing ton to the off timing toff using a timer. Specifically, the microprocessor 70 starts an internal timer TM at the on timing ton and stops the internal timer TM at the off timing toff. The microprocessor 70 obtains the heater on time THon, which is the elapsed time from the on timing ton to the off timing toff, by using the count value of the stopped timer TM.

Figure 2:
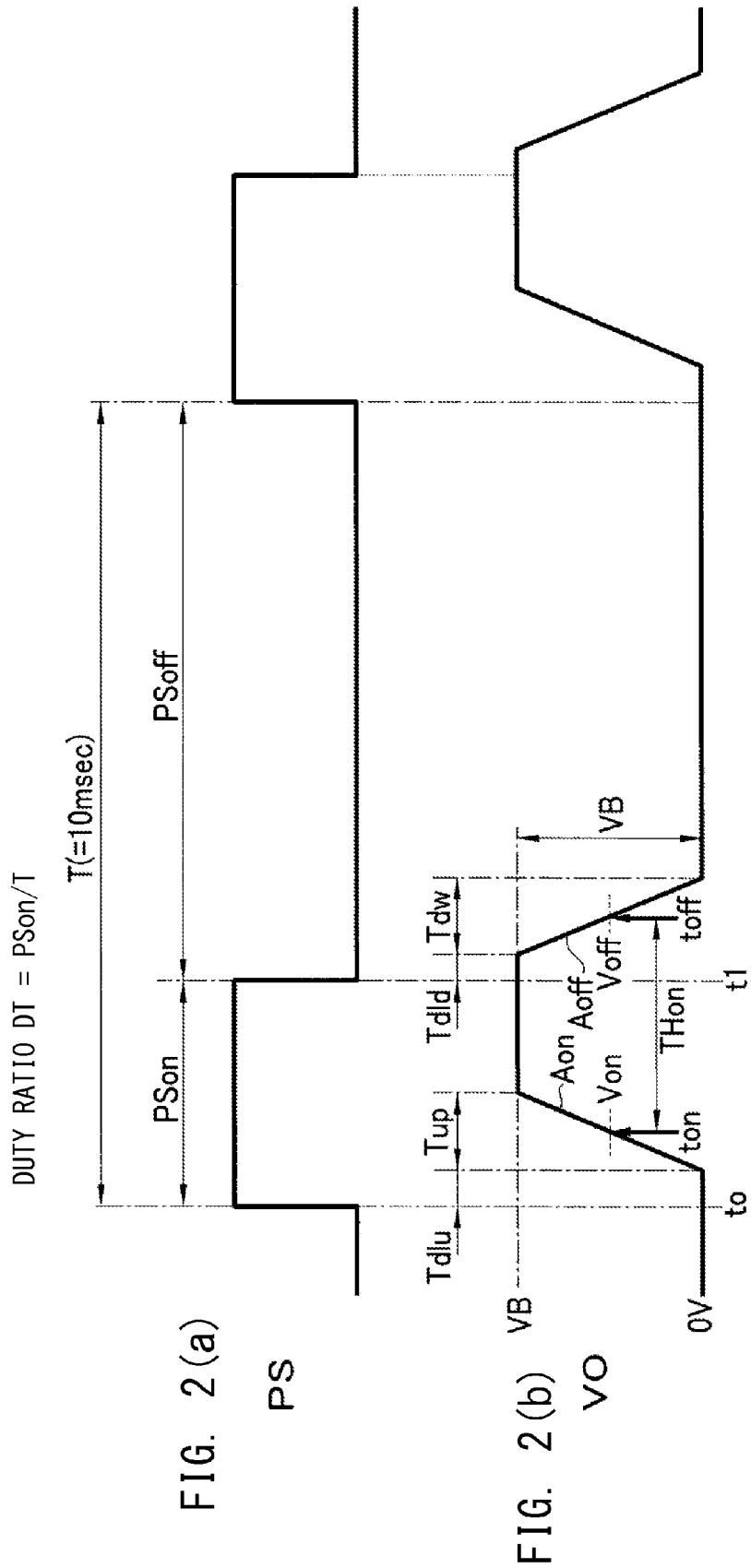
FIGS. 2(a) and 2(b) are timing charts showing the relationship between a pulse drive signal (FIG. 2(a)) and output voltage (FIG. 2(b)) of a heater driver in the gas sensor control apparatus according to the embodiment.

In FIGS. 2(*a*) and 2(*b*), the change in output voltage VO per unit time during the period in which the heater driver 51 turns on (the slope of the output voltage VO during the turn on period in FIG. 2(*b*)) is shown as a turn on rate Aon (V/μsec). In the present embodiment, the turn on rate Aon is a positive value. Also, the change in output voltage VO per unit time during the period in which the heater driver 51 turns off (the slope of the output voltage VO during the turn off period in FIG. 2(*b*)) is shown as a turn off rate Aoff (V/μsec). In the present embodiment, the turn off rate Aoff is a negative value. The turn on rate Aon and the turn off rate Aoff are determined by the characteristics of the heater section control circuit 50 and the heater driver 51. Therefore, the microprocessor 70 stores in a nonvolatile memory 77 the values of the turn on rate Aon and the turn off rate Aoff which were obtained in advance through actual measurement (see FIG. 1).

The power supply voltage VB of the power supply BT is divided by a resistor R3 and a resistor R4, and the voltage VB2 (=VB×R4/(R3+R4)) obtained through the voltage division is input to an A/D input port 74 of the microprocessor 70. By virtue of this configuration, the microprocessor 70 can detect the power supply voltage VB through the A/D input port 74.

For each period T, the microprocessor 70 calculates a unit actual electric energy WA, which is the electric energy actually applied to the heater section 4, from the power supply voltage VB, the heater on time THon, the turn on speed Aon, and the turn off speed Aoff.

Figure 4:
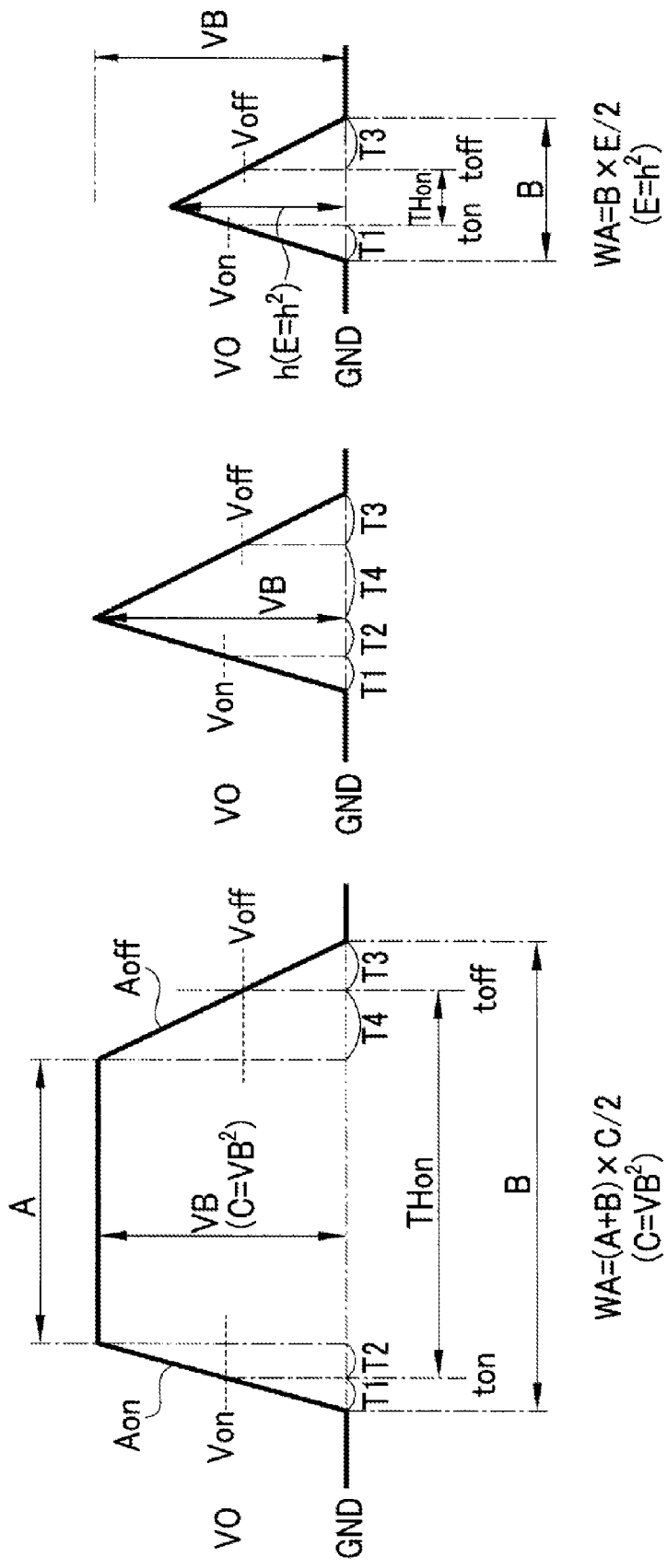
FIGS. 4(a) through 4(c) illustrate a method of calculating unit actual electric energy according to the embodiment.

FIGS. 4(*a*) through 4(*c*) illustrate a method of calculating the unit actual electric energy WA according to the present embodiment.

In FIG. 4(*a*), the time between a point in time at which the output voltage VO starts to rise from the reference potential GND (the off state) and the on timing ton at which the output voltage VO reaches the on threshold voltage Von is obtained by dividing the on threshold voltage Von by the turn on rate Aon. This time will be referred to as a first time T1 (=Von/Aon).

Also, the time between the on timing ton and a point in time at which the output voltage VO reaches the power supply voltage VB as a result of further rising from the on threshold voltage Von is obtained by dividing the difference between the power supply voltage VB and the on threshold voltage Von by the turn on rate Aon. This time will be referred to as a second time T2 (=(VB−Von)/Aon).

Meanwhile, as to the falling of the output voltage VO, the absolute value of a value obtained by dividing the off threshold voltage Voff by the turn off rate Aoff will be referred to as a third time T3 (=|Voff/Aoff|), and the absolute value of a value obtained by dividing the difference between the power supply voltage VB and the off threshold voltage Voff by the turn off rate Aoff will be referred to as a fourth time T4 (=|(VB−Voff)/Aoff|). The fourth time T4 is a time between a point in time at which the output voltage VO starts to fall from the on level (the on state) and the off timing toff at which the output voltage VO reaches the off threshold voltage Voff. The third time T3 is the time between the off timing toff and a point in time at which the output voltage VO reaches the reference potential GND as a result of further falling from the off threshold voltage Voff.

FIG. 4(*a*) shows a case where the heater on time THon is greater than the sum of the second time T2 and the fourth time T4 (THon>T2+T4).

In this case, the unit actual electric energy WA can be obtained from the area of a trapezoid shown in FIG. 4(*a*). However, the unit actual electric energy WA is the electric energy actually applied to the heater section 4 in each period T (not illustrated in FIGS. 4(*a*) through 4(*c*)), and is not the application voltage. Here, the electrical resistance of the heater section 4 is represented by R [Ω], the electric energy applied to the heater section 4 in each period T [s] is represented by W [W·s], the average electric power in each period T is represented by P [W], and the average applied voltage is represented by V [V]. The electric energy W, the electric power P, and the applied voltage V satisfy a relation W=P·T=(V²/R)·T. Namely, if the electrical resistance R of the heater section 4 is constant, the electric energy W is proportional to the square of the applied voltage V. Therefore, the unit actual electric energy WA is obtained by using, as the height of the trapezoid of FIG. 4(*a*), the square of the power supply voltage VB. Notably, in the description below, for the convenience of calculation, the electrical resistance R of the heater section 4 is not used for calculating the unit actual electric energy WA. Therefore, the value of the unit actual electric energy WA thus obtained corresponds to a value obtained by multiplying the actual electric energy W by the electrical resistance R of the heater section 4. This also applies to the calculation of a unit ideal electric energy WAi described below and other electric power calculations.

When a value obtained by subtracting the second time T2 and the fourth time T4 from the heater on time THon is represented by A (=THon−T2−T4), a value obtained by adding the first time T1 and the third time T3 to the heater on time THon is represented by B (=THon+T1+T3), and the square of the power supply voltage VB is represented by C (=VB²). The unit actual electric energy WA can then be calculated by the following Expression (1).

$$WA = (A+B) \times C/2 \tag{1}$$

(where A=THon−T2−T4, B=THon+T1+T3, and C=VB²)

Meanwhile, when the duty ratio decreases and the period of the on signal PSon becomes shorter, the heater on time THon becomes equal to or less than the sum of the second time T2 and the fourth time T4 (THon≤T2+T4). FIG. 4(*b*) shows the case where THon=T2+T4, and FIG. 4(*c*) shows the case where THon<T2+T4. In these cases, the unit actual electric energy WA can be obtained from the area of the triangle depicted therein.

Since the triangle of FIG. 4(*b*) and the triangle of FIG. 4(*c*) are similar in shape, the triangle of FIG. 4(*c*) is considered. When the height h of the triangle of FIG. 4(*c*) represents a voltage, the following Expressions (2) and (3) apply where the above-described B (=THon+T1+T3) is used.

$$h:VB = B:(T1+T2+T3+T4) \tag{2}$$

$$h = B/(T1+T2+T3+T4) \times VB \tag{3}$$

Accordingly, when the sum of the first time T1, the second time T2, the third time T3, and the fourth time T4 is represented by D, and the square of the product of the power supply voltage VB and a value obtained by dividing B by D (the height of the triangle when the height h represents a voltage) is represented by E (the height of the triangle when the electric energy is obtained), the unit actual electric energy WA can be calculated by the following Expression (4).

$$WA = B \times E/2 \qquad (4)$$

(where B=THon+T1+T3, D=T1+T2+T3+T4, h=B/D×VB, E=h$^2$)

Apart from calculating the unit actual electric energy WA in the above-described manner, the microprocessor 70 calculates the unit ideal electric energy WAi which is an ideal electric energy to be supplied to the heater section 4 in each period T.

The microprocessor 70 determines the duty ratio DT of the pulse drive signal PS on the basis of the unit actual electric energy WA(n) obtained for the current period T(n) and the unit ideal electric energy WAi(n) for the current period T(n) such that the unit actual electric energy WA(n+1) becomes equal to the unit ideal electric energy WAi(n+1) in the next period T(n+1). Notably, n is a natural number.

Specifically, the microprocessor 70 determines the duty ratio DT(n+1) for the next period T(n+1) in accordance with the following Expression (5) using the duty ratio DT(n) for the current period T(n), the unit ideal electric energy WAi(n) for the current period T(n), and the unit actual electric energy WA(n) obtained for the current period T(n).

$$DT(n+1) = DT(n) \times WAi(n)/WA(n) \qquad (5)$$

In the present embodiment, the microprocessor 70 determines the duty ratio DT based on the unit actual electric energy WA and the unit ideal electric energy WAi in the pre-heating period for pre-heating the sensor element section 3 before heating the sensor element section 3 to an activated state.

Notably, in this pre-heating period, the unit ideal electric energy WAi is fixed. Specifically, the unit ideal electric energy WAi is set to an electric power (3 V corresponding electric power) which corresponds to an electric power in the case where a fixed output voltage of 3.0 V is continuously applied (WAi=3.0$^2$ (the obtained by multiplying the electric energy W by the electrical resistance R of the heater section 4)). Therefore, when the power supply voltage VB of the power supply BT is 24 V (standard), the calculated duty ratio DT corresponding to the unit ideal electric energy WAi becomes 3.0$^2$/24$^2$=1.56%. Meanwhile, in the case where the power supply voltage VB has dropped to 16 V, the calculated duty ratio DT corresponding to the unit ideal electric energy WAi becomes 3.0$^2$/16$^2$=3.52%. Also, in the case where the power supply voltage VB is increased to 32 V, the calculated duty ratio DT corresponding to the unit ideal electric energy WAi becomes 3.0$^2$/32$^2$=0.88%.

In the present embodiment, when the supply of electric current to the heater section 4 is started so as to pre-heat the sensor element section 3 in the pre-heating period, the duty ratio DT used in this pre-heating period is set to an initial value DT(1) obtained by dividing the unit ideal electric energy WAi by the square of the power supply voltage VB detected through the A/D input port 74 (DT(1)=WAi/VB$^2$). Namely, the calculated duty ratio DT corresponding to the unit ideal electric energy WAi is used as the initial value DT(1) of the duty ratio DT.

Figure 3:
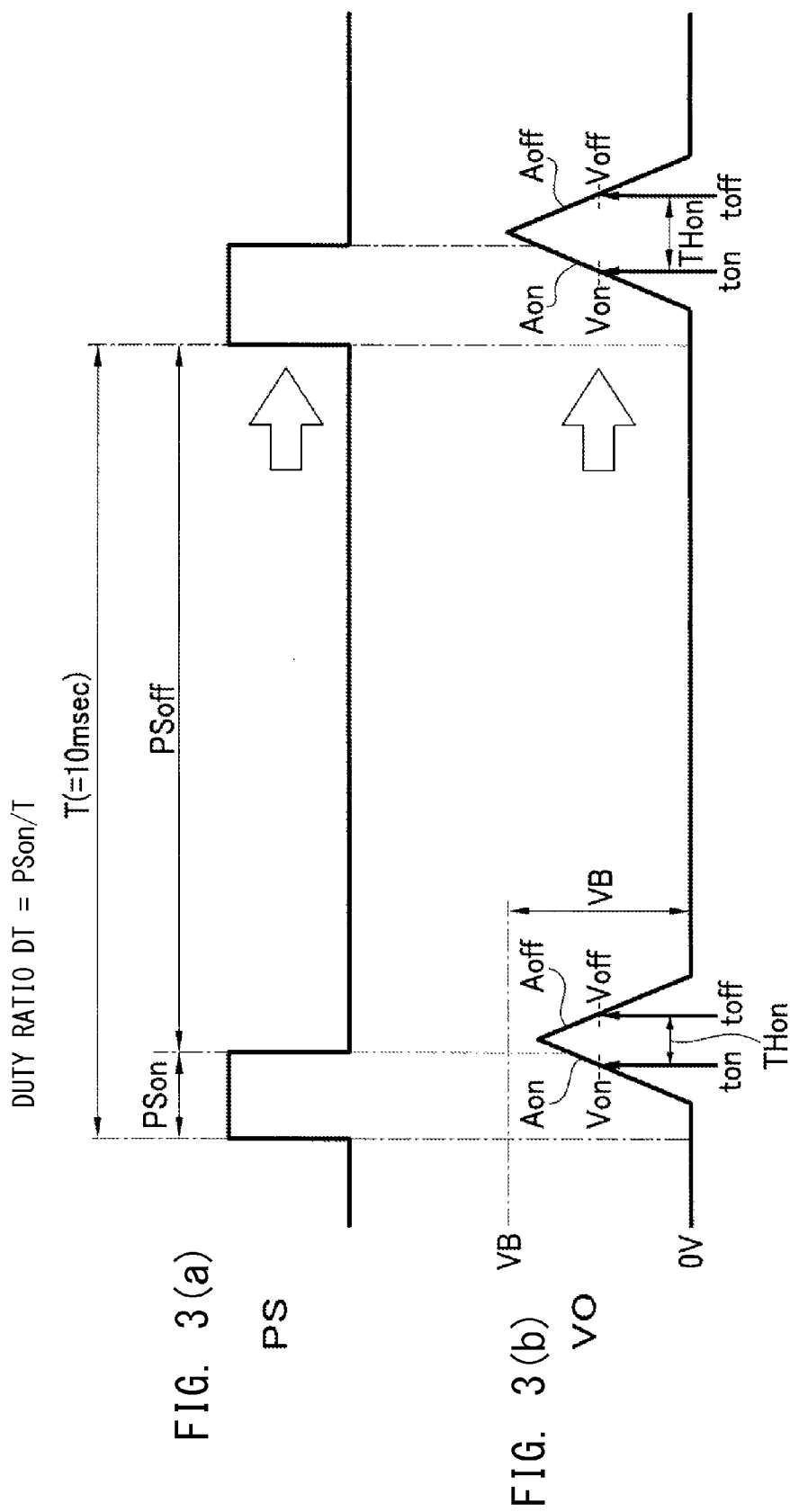
FIGS. 3(a) and 3(b) are timing charts corresponding to FIGS. 2(a) and 2(b), respectively, showing the relationship between the pulse drive signal (FIG. 3(a)) and output voltage (FIG. 3(b)) of the heater driver for the case where an instructed duty ratio is very small.

As described above, since the calculated duty ratio DT in the present embodiment becomes very small, as shown in FIGS. 3 and 4(*c*), the output voltage VO of the heater driver 51 has a triangular waveform. If no countermeasure is taken, the electric energy actually applied to the heater section 4 will be less than the unit ideal electric energy WAi.

Therefore, in the present embodiment, after outputting the pulse drive signal PS with the duty ratio DT set to the initial value DT(1), the microprocessor 70 calculates the unit actual electric energy WA actually applied to the heater section 4. After that, the microprocessor 70 determines the duty ratio DT(n+1) for the next period T(n+1) using the above-mentioned Expression (5) such that the unit actual electric energy WA(n+1) becomes equal to the unit ideal electric energy WAi(n+1) in the next period T(n+1). Therefore, after that point in time, the unit actual electric energy WA(n+1) applied to the heater section 4 assumes a corrected value, whereby the pre-heating of the sensor element section 3 can be performed properly.

Figure 5:
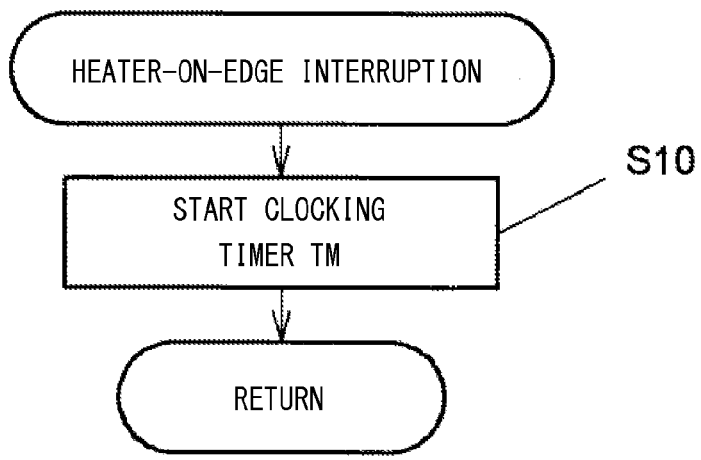
FIG. 5 is a flowchart showing heater-on-edge interruption processing of a microprocessor of the gas sensor control apparatus according to the embodiment.
Figure 6:
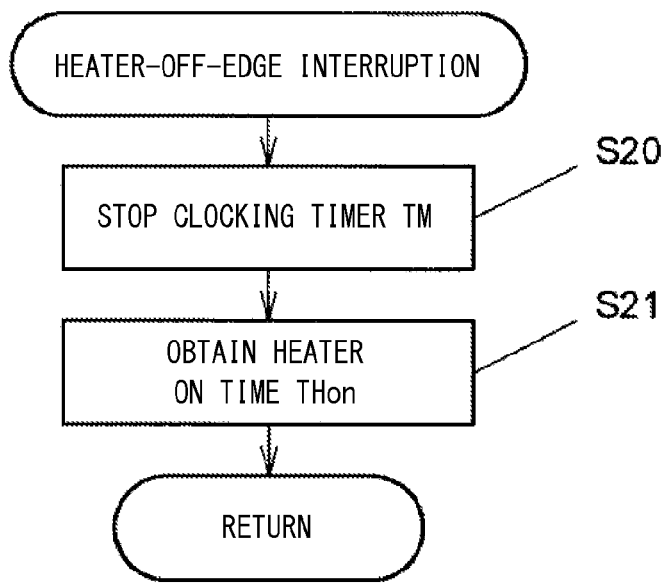
FIG. 6 is a flowchart showing heater-off-edge interruption processing of the microprocessor of the gas sensor control apparatus according to the embodiment.
Figure 7A:
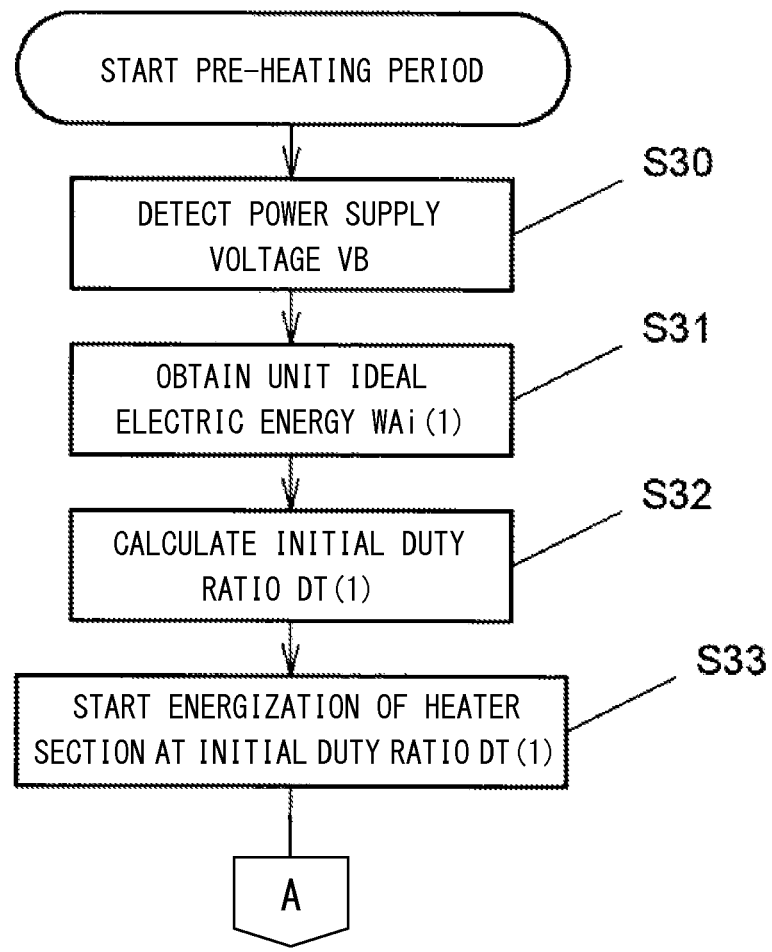
FIGS. 7(a) and 7(b) are flowcharts showing a processing operation of the microprocessor of the gas sensor control apparatus according to the embodiment during a pre-heating period.
Figure 7B:
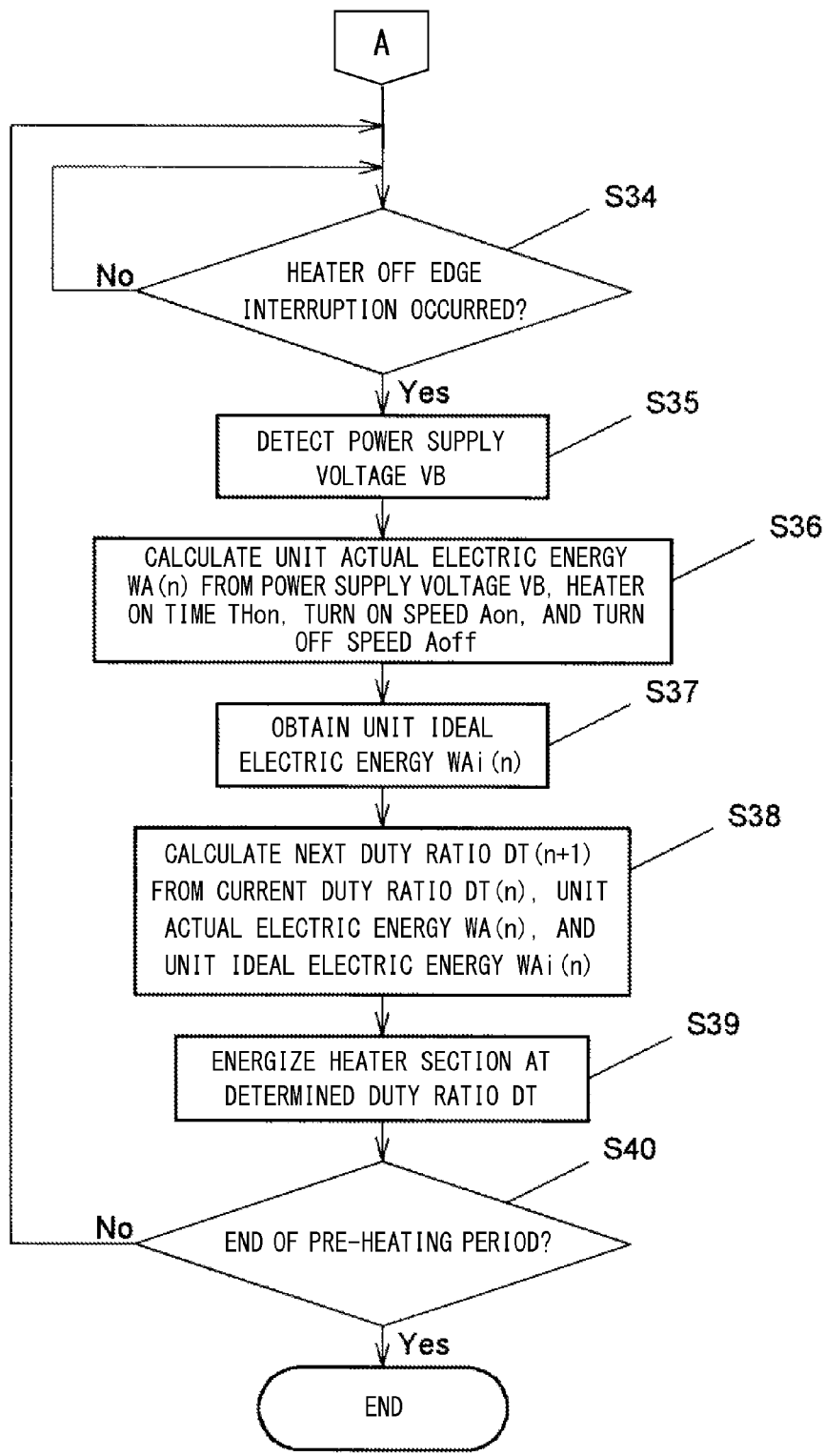

Next, the processing operation of the microprocessor 70 of the gas sensor control apparatus 1 according to the present embodiment will be described with reference to the flowcharts of FIGS. 5 through 7(*b*).

First, a heater-on-edge interruption routine shown in FIG. 5 will be described. This heater-on-edge interruption routine is an interruption processing routine which is performed when the potential at the interruption input terminal 76 of the microprocessor 70 begins to rise.

When a heater-on-edge interruption occurs (on timing ton), the microprocessor 70 starts the internal clocking timer TM in step S10, and then ends this heater-on-edge interruption routine.

Next, a heater-off-edge interruption routine shown in FIG. 6 will be described. This heater-off-edge interruption routine is an interruption processing routine which is performed when the potential at the interruption input terminal 76 of the microprocessor 70 begins to fall.

When a heater-off-edge interruption occurs (off timing toff), in step S20, the microprocessor 70 first stops the clocking timer TM which was started in step S10 of the heater-on-edge interruption routine.

Next, in step S21, the microprocessor 70 obtains, from the count value of the stopped timer TM, the heater on time THon, which is the elapsed time from the timing (on timing ton) at which the heater-on-edge interruption has occurred to the timing (off timing toff) at which the heater-off-edge interruption has occurred. The microprocessor 70 then ends the heater-off-edge interruption routine.

Next, the processing operation of the microprocessor 70 during the pre-heating period shown in FIGS. 7(*a*) and 7(*b*) will be described.

When the pre-heating period is started, first, in step S30, the microprocessor 70 detects the power supply voltage VB through the A/D input port 74.

Next, in step S31, the microprocessor 70 obtains, from its memory, the unit ideal electric energy WAi(1) in the first period T(1) of the pulse drive signal PS (at the time when energization of the heater section 4 begins). Notably, in the present embodiment, the unit ideal electric energy WAi during the pre-heating period is fixed to an electric power corresponding to 3V (WAi(1)=WAi).

Next, in step S32, the microprocessor 70 calculates the initial duty ratio DT(1) (DT(1)=WAi(1)/VB$^2$) from the power supply voltage VB and the unit ideal electric energy WAi(1).

In step S33 subsequent thereto, the microprocessor 70 starts energization of the heater section 4 while setting the duty ratio of the pulse drive signal PS to the initial duty ratio DT(1). After that point in time, the heater-on-edge interruption and the heater-off-edge interruption are permitted.

Next, in step S34, the microprocessor 70 determines whether or not the heater-off-edge interruption has occurred. Namely, the microprocessor 70 determines whether or not the heater on time THon has been obtained in step S21. In the case where the heater-off-edge interruption has not yet occurred (No), the microprocessor 70 repeats step S34. In the case where the heater-off-edge interruption has occurred (Yes), namely, when the heater on time THon has been obtained, the microprocessor 70 proceeds to step S35.

In step S35, the microprocessor 70 detects the power supply voltage VB through the A/D input port 74 as in the case of step S30.

Next, in step S36, the microprocessor 70 calculates the unit actual electric energy WA(n) for the current period T(n) from the power supply voltage VB, the heater on time THon, and the turn on speed Aon and turn off speed Aoff stored in the non-volatile memory 77.

In step S37 subsequent thereto, the microprocessor 70 obtains, from its memory, the unit ideal electric energy WAi(n) for the current period T(n). Notably, as described above, in the present embodiment, the unit ideal electric energy WAi(n) during the pre-heating period is an electric power corresponding to 3V (fixed) (WAi(n)=WAi(1)=WAi).

Next, in step S38, the microprocessor 70 calculates the duty ratio DT(n+1) for the next period T(n+1) from the duty ratio DT(n), the unit actual electric energy WA(n), and the unit ideal electric energy WAi(n) in the current period T(n), in accordance with the above-described Expression (5): DT(n+1)=DT(n)×WAi(n)/WA(n).

Next, in step S39, the microprocessor 70 turns the heater driver 51 on and off at the determined duty ratio DT(=DT(n+1)), to thereby control the energization of the heater section 4.

In step S40 subsequent thereto, the microprocessor 70 determines whether or not the pre-heating period ends. In the case where the pre-heating period does not end (No), the microprocessor 70 returns to step S34 and continues the control for the pre-heating period. Meanwhile, in the case where the pre-heating period ends (Yes), the microprocessor 70 ends the present control routine for the pre-heating period.

In the present embodiment, the heater section control circuit 50 and the microprocessor 70 which executes steps S33 and S39 correspond to the heater energization control means. The A/D input port 74 of the microprocessor 70 and the microprocessor 70 which executes steps S30 and S35 correspond to the power supply voltage detection means.

The interruption input terminal 76 of the microprocessor 70 and the microprocessor 70 which executes step S10 correspond to the on-timing detection means, and the interruption input terminal 76 of the microprocessor 70 and the microprocessor 70 which executes step S20 correspond to the off-timing detection means.

The timer TM of the microprocessor 70 and the microprocessor 70 which executes step S21 correspond to the clocking means, and the nonvolatile memory 77 of the microprocessor 70 corresponds to the storage means.

The microprocessor 70 which executes steps S31 and S37 corresponds to the ideal electric energy obtaining means, and the microprocessor 70 which executes step S36 corresponds to the actual electric energy calculation means. The microprocessor 70 which executes step S32 corresponds to the initial duty ratio calculation means, and the microprocessor 70 which executes step S38 corresponds to the duty ratio determination means.

As described above, the gas sensor control apparatus 1 (heater control apparatus) of the present embodiment comprises ideal electric energy obtaining means for obtaining the unit ideal electric energy WAi and actual electric energy calculation means for calculating the unit actual electric energy WA. On the basis of the unit actual electric energy WA(n) obtained for the current period T(n) and the unit ideal electric energy WAi(n) for the current period T(n) (an electric power corresponding to 3V in the present embodiment), the duty ratio DT(n+1) for the next period T is determined such that the unit actual electric energy WA(n+1) becomes equal to the unit ideal electric energy WAi(n+1) (=an electric power corresponding to 3V) in the next period T(n+1). As a result, even in the case where the calculated duty ratio DT becomes small, the requisite amount of electric energy can be applied to the heater section 4. This is because the duty ratio DT is corrected such that the unit actual electric energy WA actually applied to the heater section 4 becomes equal to the unit ideal electric energy WAi. Thus, the pre-heating of the heater section 4 and the sensor element section 3 can be performed properly during the pre-heating period.

The gas sensor control apparatus 1 of the present embodiment comprises on-time obtaining means for obtaining the heater on time THon (the time between a point at which the heater driver 51 actually turns on and a point at which the heater driver 51 actually turns off). The gas sensor control apparatus 1 calculates the unit actual electric energy WA using the detected power supply voltage VB and the heater on time THon. In the present embodiment, since the separately stored values of the turn on speed Aon and the turn off speed Aoff are used, the unit actual electric energy WA can be properly calculated by obtaining the power supply voltage VB and the heater on time THon.

In the gas sensor control apparatus 1 of the present embodiment, the on-time obtaining means includes on-timing detection means, off-timing detection means, and clocking means. Therefore, the gas sensor control apparatus 1 can properly obtain, as the heater on time THon, the elapsed time from the on timing ton to the off timing toff.

In the gas sensor control apparatus 1 of the present embodiment, the unit actual electric energy WA(n) is calculated from the detected power supply voltage VB, the heater on time THon, and the turn on rate Aon and the turn off rate Aoff which are stored values. Therefore, it is possible to properly calculate the unit actual electric energy WA(n) and properly determine the duty ratio DT(n+1) for the next period T(n+1).

In the gas sensor control apparatus 1 of the present embodiment in which the heater driver 51 is a high side driver, the unit actual electric energy WA can be simply obtained in accordance with the above-described Expressions (1) through (4).

In the gas sensor control apparatus 1 of the present embodiment, the duty ratio DT(n+1) for the next period T(n+1) is calculated in accordance with the above-described Expression (5). Therefore, the duty ratio DT(n+1) for the next period T(n+1) can be properly determined through simple computation.

In the gas sensor control apparatus 1 of the present embodiment, the value obtained by dividing the unit ideal electric energy WAi(1) (an electric power corresponding to 3V in the present embodiment) in the first period T(1) of the pulse drive signal PS (at the time when the energization of the heater section 4 starts) by the square of the power supply voltage VB is used as the initial value DT(1) of the duty ratio DT. Since the initial value DT(1) of the duty ratio DT can be set to a proper value based on the unit ideal electric energy WAi, it is possible to obtain a proper unit actual electric energy WA at the beginning and subsequently to properly determine the duty ratio DT.

In the gas sensor control apparatus 1 of the present embodiment, the duty ratio determination means determines the duty ratio DT in the pre-heating period for pre-heating the sensor element section 3 before heating the sensor element section 3 to the activated state. In the present embodiment, the duty ratio DT may have a very small calculated value during the pre-heating period. However, the pre-heating of the sensor element section 3 can be properly performed by determining the duty ratio DT properly such that the unit actual electric energy WA becomes equal to the unit ideal electric energy WAi.

In the present embodiment, the gas sensor 2 and the gas sensor control apparatus 1 constitute the sensor control system 100.

Since the sensor control system 100 can apply a proper amount of electric energy to the heater section 4 of the gas sensor 2, control of the gas sensor 2 can be performed properly.

Modified Embodiment

Next, a modification of the above-described embodiment will be described with reference to FIG. 8. In the gas sensor control apparatus 1 (heater control apparatus) and the sensor control system 100 according to the embodiment, the heater driver 51 of the heater section control circuit 50 is a high side driver which is interposed between the power supply BT and the heater section 4.

In contrast, in the gas sensor control apparatus 1A (heater control apparatus) and the sensor control system 100A according to the present modified embodiment, a heater driver 151 of a heater section control circuit 150 is a low side driver which is interposed between the heater section 4 and the reference potential GND.

Figure 8:
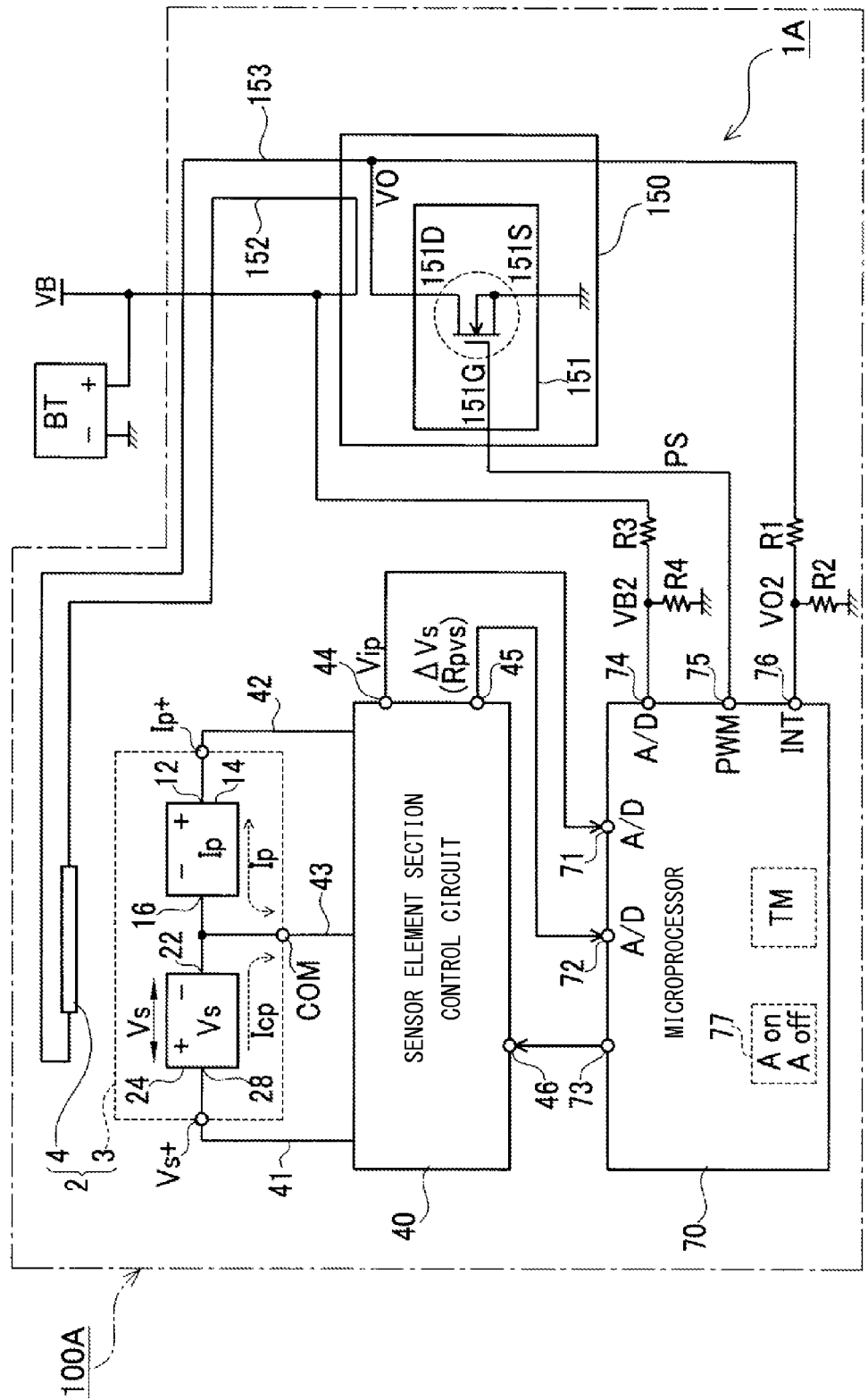
FIG. 8 is an explanatory diagram schematically showing the configurations of a gas sensor control apparatus and a sensor control system according to a modified embodiment.

As shown in FIG. 8, the heater section control circuit 150, which serves as the heater energization control means, has the heater driver 151 including a power MOS-FET. A drain 151D (output terminal) of the heater driver 151 is connected to one end of the heater section 4 of the gas sensor 2 via a lead wire 153. The other end of the heater section 4 is connected to the heater section control circuit 150 via a lead wire 152, and is connected, within the heater section control circuit 150, to the + terminal of the power supply BT which outputs the power supply voltage VB. A source 151S of the heater driver 151 is connected to the reference potential GND. Namely, the heater driver 151 is a low side driver which is disposed between the heater section 4 and the reference potential GND. A gate 151G of the heater driver 151 is connected to the PWM output port 75 of the microprocessor 70. The heater driver 151 is turned on and off in accordance with the pulse drive signal PS output from the PWM output port 75, whereby the supply of electric current to the heater section 4 is controlled.

The drain 151D (output terminal) of the heater driver 151 is connected to one end of the heater section 4 through the lead wire 153, and is also connected to the interruption input terminal (INT) 76 of the microprocessor 70 through a resistor R1. Further, the interruption input terminal 76 is connected to the reference potential (GND) through a resistor R2. Namely, the output voltage VO at the drain 151D of the heater driver 151 is divided by the resistor R1 and the resistor R2, and the voltage VO2 (=VO×R2/(R1+R2)) obtained as a result of the voltage division is input to the interruption input terminal 76 (see FIG. 8).

When the voltage VO2 input to the interruption input terminal 76 changes from the high level to the low level, a falling edge interruption to the microprocessor 70 occurs.

Also, when the voltage VO2 changes from the low level to the high level, a rising edge interruption to the microprocessor 70 occurs.

In the present modified embodiment, since the hater driver 151 is a low side driver, as shown in FIGS. 9(*a*) through 9(*c*), the output voltage VO of the heater driver 151 falls when the heater driver 151 turns on and rises when the heater driver 151 turns off.

Accordingly, the falling edge interruption to the microprocessor 70 occurs at a timing at which the output voltage VO reaches a predetermined on threshold voltage Von as a result of falling from the power supply voltage VB during a period in which the heater driver 151 turns on after the pulse drive signal PS is changed from the off signal PSoff to the on signal PSon. In the present modified embodiment, this falling edge interruption corresponds to the heater-on-edge interruption of FIG. 5, and the timing at which the falling edge interruption occurs is the on timing ton.

Also, the rising edge interruption to the microprocessor 70 occurs at a timing at which the output voltage VO reaches the predetermined off threshold voltage Voff as a result of rising during a period in which the heater driver 151 turns off after the pulse drive signal PS is changed from the on signal PSon to the off signal PSoff. In the present modified embodiment, this rising edge interruption corresponds to the heater-on-edge interruption of FIG. 6, and the timing at which the rising edge interruption occurs is the off timing toff.

FIGS. 9(*a*) through 9(*c*) illustrate a method of calculating the unit actual electric energy WA according to the present modified embodiment.

In FIG. 9(*a*), the time between a point in time at which the output voltage VO begins to fall from the power supply voltage VB (the off state) during the turn on period of the heater driver 151 and the on timing ton at which the output voltage VO reaches the on threshold voltage Von is the absolute value of a value obtained by dividing the difference between the power supply voltage VB and the on threshold voltage Von by the turn on rate Aon. This time will be referred to as a first time T1 $(=|(VB-Von)/Aon|)$.

Also, the time between the on timing ton and a point in time at which the output voltage VO reaches the reference potential GND as a result of further falling from the on threshold voltage Von is the absolute value of a value obtained by dividing the on threshold voltage Von by the turn on rate Aon. This time will be referred to as a second time T2 $(=|Von/Aon|)$.

Meanwhile, as to the rising of the output voltage VO during the turn off period of the heater driver 151, a value obtained by dividing the difference between the power supply voltage VB and the off threshold voltage Voff by the turn off rate Aoff will be referred to as a third time T3 $(=(VB-Voff)/Aoff)$, and a value obtained by dividing the off threshold voltage Voff by the turn off rate Aoff will be referred to as a fourth time T4 $(=Voff/Aoff)$. The fourth time T4 is a time between a point in time at which the output voltage VO begins to rise from the reference potential GND (the on state) and the off timing toff at which the output voltage VO reaches the off threshold voltage Voff. The third time T3 is the time between the off timing toff and a point in time at which the output voltage VO reaches the power supply voltage VB as a result of further rising from the off threshold voltage Voff.

FIG. 9(*a*) shows a case where the heater on time THon is greater than the sum of the second time T2 and the fourth time T4 (THon>T2+T4).

In this case, the unit actual electric energy WA can be obtained from the area of the trapezoid shown in FIG. 9(*a*).

However, the unit actual electric energy WA is obtained using, as the height of the trapezoid of FIG. 9(a), the square of the power supply voltage VB instead of the power supply voltage VB as is.

Accordingly, when a value obtained by subtracting the second time T2 and the fourth time T4 from the heater on time THon is represented by A (=THon−T2−T4), a value obtained by adding the first time T1 and the third time T3 to the heater on time THon is represented by B (=THon+T1+T3), and the square of the power supply voltage VB is represented by C (=VB$^2$), the unit actual electric energy WA can be calculated by the following Expression (6).

$$WA=(A+B)\times C/2 \tag{6}$$

(where A=THon−T2−T4), B=THon+T1+T3, and C=VB$^2$)

Meanwhile, when the duty ratio decreases and the period of the on signal PSon becomes shorter, the heater on time THon becomes equal to or less than the sum of the second time T2 and the fourth time T4 (THon≤T2+T4). FIG. 9(b) shows the case where THon=T2+T4, and FIG. 9(c) shows the case where THon<T2+T4. In these cases, the unit actual electric energy WA can be obtained from the area of the triangle depicted therein.

Since the triangle of FIG. 9(b) and the triangle of FIG. 9(c) are similar in shape, the triangle of FIG. 9(c) is considered. When the height h of the triangle of FIG. 9(c) represents a voltage, the following Expressions (7) and (8) apply where the above-described B (=THon+T1+T3) is used.

$$h:VB=B:(T1+T2+T3+T4) \tag{7}$$

$$h=B/(T1+T2+T3+T4)\times VB \tag{8}$$

Accordingly, when the sum of the first time T1, the second time T2, the third time T3, and the fourth time T4 is represented by D, and the square of the product of the power supply voltage VB and a value obtained by dividing B by D (the height of the triangle when the height h is considered to represent a voltage) is represented E (the height of the triangle when the electric energy is obtained), the unit actual electric energy WA can be calculated by the following Expression (9).

$$WA=B\times E/2 \tag{9}$$

(where B=THon+T1+T3, D=T1+T2+T3+T4, h=B/D×VB, E=h$^2$)

As described above, the method of calculating the unit actual electric energy WA according to the present modified embodiment differs from that of the embodiment in the method of calculating T1, T2, T3 and T4. However, Expressions (6) through (9) are identical with Expressions (1) through (4) used in the embodiment.

As in the case of the embodiment, this unit actual electric energy WA and the separately obtained unit ideal electric energy WAi are used to calculate the duty ratio DT in accordance with Expression (5) during the pre-heating period for pre-heating the sensor element section 3.

The present modified embodiment is identical with the embodiment in terms of the flowcharts of the processing operation of the microprocessor 70 shown in FIGS. 5 through 7(b), the configurations of various sections, etc. Therefore, their descriptions will be omitted. The present modified embodiment is identical with the embodiment except that the unit actual electric energy WA is calculated in a different way, the heater driver 151 is a low side driver, and the heater section control circuit 150 corresponds to the heater energization control means.

As described above, in the gas sensor control apparatus 1A of the present modified embodiment in which the heater driver 151 is a low side driver, the unit actual electric energy WA can be simply obtained by the above-described Expressions (6) through (9) as in the case of the embodiment.

Further, since the duty ratio DT is determined by obtaining the unit actual electric energy WA, a proper amount of electric energy can be applied to heater section 4. Thus, the pre-heating of the heater section 4 and the sensor element section 3 can be performed properly during the pre-heating period. The present modified embodiment achieves an action and effects similar to those of the embodiment.

In the above, the heater control apparatus of the present invention has been described on the basis of the gas sensor control apparatuses 1 and 1A and the sensor control systems 100 and 100A according to the embodiment and the modified embodiment. However, needless to say, the present invention is not limited to the embodiment and modifications, and can be further modified freely without departing from the scope of the invention.

For example, in the embodiment and the modified embodiment, the gas sensor 2 which is an air-fuel ratio sensor for detecting the concentration of oxygen contained in exhaust gas (air-fuel ratio) is used as a sensor having a heater section. However, the sensor having a heater section is not limited to an air-fuel ratio sensor, and may be an oxygen sensor for detecting the concentration (lean/rich) of oxygen, an NOx sensor for detecting the concentration of nitrogen oxide (NOx), or the like.

In the embodiment and the modified embodiment, the unit ideal electric energy WAi is fixed to a predetermined value (3 V corresponding electric power) during the pre-heating period. However, the unit ideal electric energy WAi(n) for the period T(n) may be changed with time in accordance with a predetermined pattern.

In the embodiment and the modified embodiment, the unit actual electric energy WA(n) is calculated using not only the detected power supply voltage VB and the heater on time THon, but also the turn on rate Aon and the turn off rate Aoff which are stored separately. However, instead of using the turn on rate Aon and the turn off rate Aoff, a previously prepared reference table for obtaining the unit actual electric energy WA(n) in accordance with the power supply voltage VB and the heater on time THon may be used. Namely, the unit actual electric energy WA(n) may be obtained by referring to the reference table.

In the embodiment and the modified embodiment, the rising edge interruption and falling edge interruption to the microprocessor 70 are generated based on a change of the output voltage VO of the heater driver 51; the heater on time Thon is obtained which is the elapsed time from the on timing ton at which the rising edge interruption occurs to the off timing toff at which the falling edge interruption occurs, and the unit actual electric energy WA(n) is calculated using the heater on time THon and the separately stored turn on rate Aon and turn off rate Aoff.

Further, the embodiment and the modified embodiment may be modified to actually measure the change of the output voltage VO of the heater driver 51 in real time using, for example, a high-speed A/D converter and a DSP (digital signal processor) which can perform high speed processing, to thereby calculate the unit actual electric energy WA(n)

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2012-238323 filed Oct. 29, 2012, incorporated herein by reference in its entirety.

What is claimed is:

1. A heater control apparatus configured for controlling a heater section of a sensor, the heater control apparatus comprising:
a heater driver which is turned on and off in accordance with a pulse drive signal composed of an on signal and an off signal appearing alternatingly and which supplies electric power from a power supply to the heater section;
heater energization control means for outputting the pulse drive signal to the heater driver so as to control the supply of electric current to the heater section;
power supply voltage detection means for detecting a power supply voltage of the power supply;
ideal electric energy obtaining means for obtaining a unit ideal electric energy which is an ideal electric energy to be applied to the heater section in respective periods of the pulse drive signal;
actual electric energy calculation means for calculating an unit actual electric energy which is an electric energy actually applied to the heater section in the respective periods; and
duty ratio determination means for determining a duty ratio of the pulse drive signal based on the unit actual electric energy obtained for the current period and the unit ideal electric energy for the current period such that the unit actual electric energy becomes equal to the unit ideal electric energy in a next period.

2. The heater control apparatus as claimed in claim 1, further comprising on-time obtaining means for obtaining a heater on time which is a time between a point when the heater driver has actually turned on and a point when the heater driver has actually turned off, wherein
the actual electric energy calculation means calculates the unit actual electric energy based on the power supply voltage and the heater on time.

3. The heater control apparatus as claimed in claim 2, wherein the on-time obtaining means includes:
on-timing detection means for detecting an on timing at which the output voltage of the heater driver reaches a predetermined on threshold voltage in a period in which the heater driver turns on after the pulse drive signal has been changed from the off signal to the on signal;
off-timing detection means for detecting an off timing at which the output voltage reaches a predetermined off threshold voltage in a period in which the heater driver turns off after the pulse drive signal has been changed from the on signal to the off signal; and
clocking means for clocking, as the heater on time, a time between the on timing and the off timing.

4. The heater control apparatus as claimed in claim 3, further comprising storage means for storing a turn on rate which is a change in the output voltage per unit time during the period in which the heater driver turns on and a turn off rate which is a change in the output voltage per unit time during the period in which the heater driver turns off, wherein
the actual electric energy calculation means calculates the unit actual electric energy based on the power supply voltage, the heater on time, the turn on rate, and the turn off rate.

5. The heater control apparatus as claimed in claim 4, wherein
the heater driver is a high side driver disposed between the power supply and the heater section;
the actual electric energy calculation means obtains, as a first time, a value calculated by dividing the on threshold voltage by the turn on rate, obtains, as a second time, a value calculated by dividing a difference between the power supply voltage and the on threshold voltage by the turn on rate, obtains, as a third time, the absolute value of a value calculated by dividing the off threshold voltage by the turn off rate, and obtains, as a fourth time, the absolute value of a value calculated by dividing a difference between the power supply voltage and the off threshold voltage by the turn off rate; and
the actual electric energy calculation means calculates the unit actual electric energy in accordance with an expression $WA=(A+B)\times C/2$ when the heater on time is greater than the sum of the second time and the fourth time, and calculates the unit actual electric energy in accordance with an expression $WA=B\times E/2$ when the heater on time is equal to or less than the sum of the second time and the fourth time, wherein A represents a value obtained by subtracting the second time and the fourth time from the heater on time, B represents a value obtained by adding the first time and the third time to the heater on time, C represents the square of the power supply voltage, D represents a value obtained by adding the first time, the second time, the third time and the fourth time, and E represents the square of the product of the power supply voltage and a value obtained by dividing B by D.

6. The heater control apparatus as claimed in claim 4, wherein
the heater driver is a low side driver disposed between the heater section and a reference potential;
the actual electric energy calculation means obtains, as a first time, the absolute value of a value calculated by dividing a difference between the power supply voltage and the on threshold voltage by the turn on rate, obtains, as a second time, the absolute value of a value calculated by dividing the on threshold voltage by the turn on rate, obtains, as a third time, a value calculated by dividing a difference between the power supply voltage and the off threshold voltage by the turn off rate, and obtains, as a fourth time, a value calculated by dividing the off threshold voltage by the turn off rate; and
the actual electric energy calculation means calculates the unit actual electric energy in accordance with an expression $WA=(A+B)\times C/2$ when the heater on time is greater than the sum of the second time and the fourth time, and calculates the unit actual electric energy in accordance with an expression $WA=B\times E/2$ when the heater on time is equal to or less than the sum of the second time and the fourth time, wherein A represents a value obtained by subtracting the second time and the fourth time from the heater on time, B represents a value obtained by adding the first time and the third time to the heater on time, C represents the square of the power supply voltage, D represents a value obtained by adding the first time, the second time, the third time and the fourth time, and E represents the square of the product of the power supply voltage and a value obtained by dividing B by D.

7. The heater control apparatus as claimed in claim 1, wherein the duty ratio determination means calculates the duty ratio for the next period in accordance with an expression $DT(n+1)=DT(n) \times WAi(n)/WA(n)$ (n: natural number), wherein $DT(n)$ represents the duty ratio in the current period, $WAi(n)$ represents the unit ideal electric energy for the current period, and $WA(n)$ represents the unit actual electric energy obtained for the current period.

8. The heater control apparatus as claimed in claim 1, further comprising initial duty ratio calculation means for calculating an initial value of the duty ratio by dividing the unit ideal electric energy in the first period by the square of the power supply voltage.

9. The heater control apparatus as claimed in claim 1, wherein the sensor includes a sensor element section formed of a solid electrolyte body;

the heater section heats the sensor element section; and the duty ratio determination means determines the duty ratio in a period for pre-heating the sensor element section before heating the sensor element section to an activated state.

10. A sensor control system comprising a sensor having a heater section, and the heater control apparatus as claimed in claim 1.

\* \* \* \* \*